C. J. ROTTMANN.
ELECTRODE FOR ELECTROLYTIC CELLS AND PROCESS OF MAKING THE SAME.
APPLICATION FILED APR. 5, 1917. RENEWED JULY 3, 1920.
1,367,097.
Patented Feb. 1, 1921.
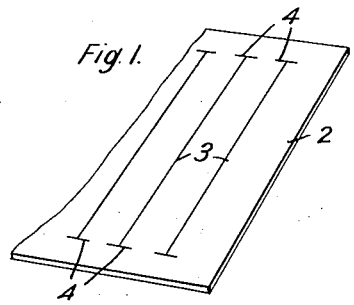
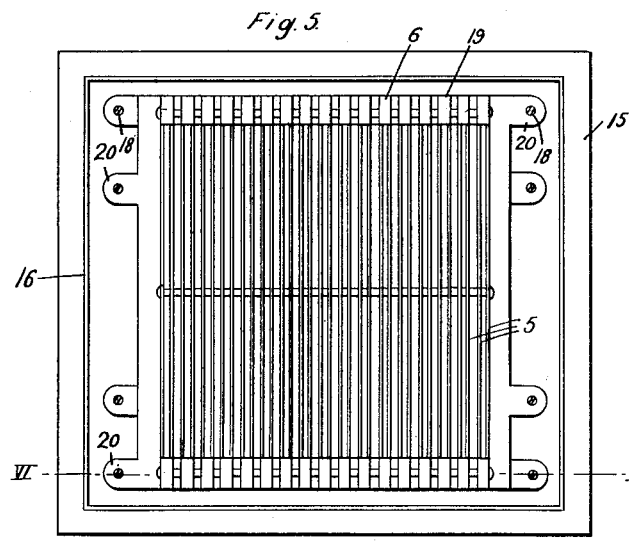
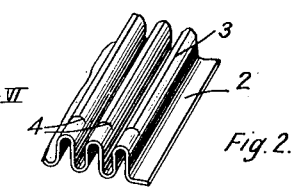
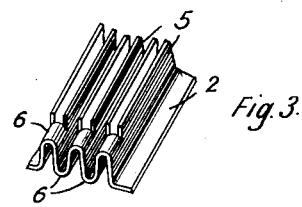
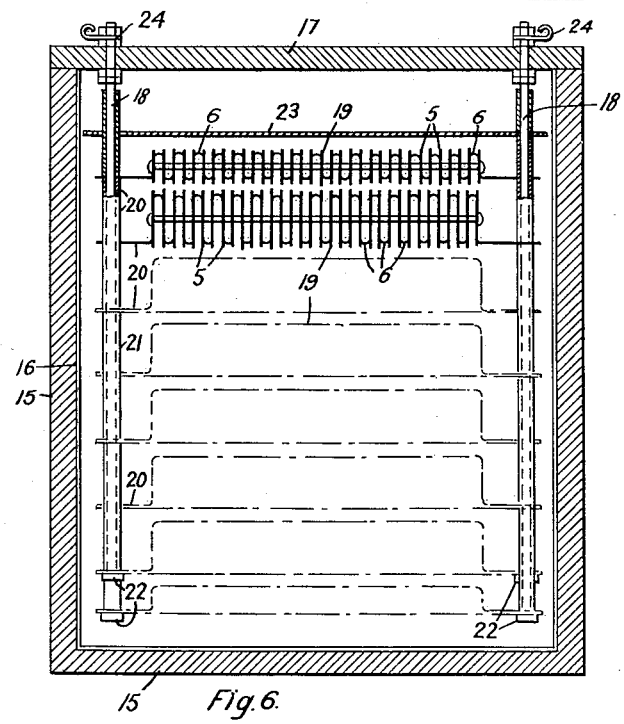
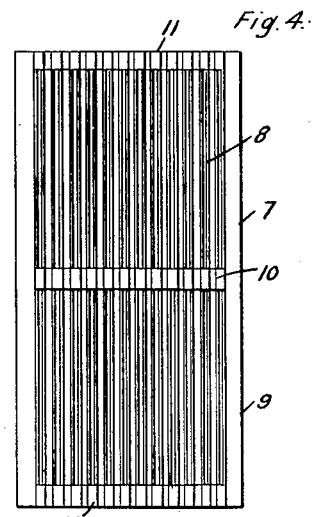
WITNESSES:
Fred H Miller
Roberson De S Brown
INVENTOR
Clarence J. Rottmann
BY
Chesley J Carr
ATTORNEY

UNITED STATES PATENT OFFICE.

CLARENCE J. ROTTMANN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE FOR ELECTROLYTIC CELLS AND PROCESS OF MAKING THE SAME.

1,367,097. Specification of Letters Patent. Patented Feb. 1, 1921.

Application filed April 5, 1917, Serial No. 160,034. Renewed July 3, 1920. Serial No. 394,015.

*To all whom it may concern:*

Be it known that I, CLARENCE J. ROTTMANN, a citizen of the United States, and a resident of Wilkinsburg, in the county of Allegheny and State of Pennsylvania, have invented a new and useful Improvement in Electrodes for Electrolytic Cells and Processes of Making the Same, of which the following is a specification.

My invention relates to electrolytic cells such as condensers, lightning arresters, rectifiers and the like, and it has for its object to provide an electrode construction for cells of the character indicated which shall present a large surface area to the action of the electrolyte of the cell in proportion to the volume occupied by the electrode, and in which the electrode shall be composed of a single sheet of filming material.

More specifically, one object of my invention is to provide an electrode for electrolytic cells of the above-indicated character which shall be composed of a considerable number of side-by-side elements of filming material connected at their ends by corrugated end pieces integral with the side-by-side electrode elements.

Another object of my invention is to provide a simple and rapid method of constructing electrodes of the kind described above.

In the accompanying drawing, Figure 1 is a fragmentary perspective view showing a sheet of filming material to be formed into an electrode in accordance with my invention and provided with transverse slots separating the areas of the plate which are to be brought into side-by-side relation. Fig. 2 is a fragmentary perspective view showing the result of the corrugating step which forms a part of my process. Fig. 3 is a fragmentary perspective view showing one corner of a completed electrode. Fig. 4 is a plan view showing a modified form of electrode construction. Fig. 5 is a plan view, with parts shown in section and with the cover removed, of an electrolytic cell constructed in accordance with my invention. Fig. 6 is a side view, partially in elevation and partially in section, of the structure of Fig. 5, the section being taken substantially along the line VI—VI, Fig. 5.

Electrolytic cells of the kind to which my invention relates are composed of a considerable number of electrodes arranged in side-by-side relation, the alternate electrodes being connected in two sets of opposite polarity and all of the electrodes being composed of aluminum, magnesium, tantalum or other material upon which asymmetric conducting films may be produced and maintained when the electrodes are immersed in a suitable electrolyte and subjected to electric potential. It is important that each electrode shall present as large a surface area as possible to the action of the electrolyte in order that the capacity of the cell per unit volume may be sufficiently large for effective operation.

According to my present invention, I produce an electrode for electrolytic cells of the character indicated by providing a sheet of aluminum or other filming material with a series of parallel transverse slits and with short cross slits at the ends of the transverse slits, and corrugating the sheet parallel to the transverse slits and thereby bringing the areas of the plate between the transverse slits into parallel and adjacent relation. The resulting structure consists essentially of a series of side-by-side strips or ribbons of filming material united by means of integral corrugated end pieces and forming a rigid and compact structure of large surface area.

The process outlined above is illustrated in Figs. 1 to 3 of the accompanying drawing. Fig. 1 shows one end of a sheet of filming material 2, in which are formed a series of parallel transverse slits 3 and two rows of cross slits 4 at the ends of the slits 3. The sheet 2 is passed between corrugating rollers which impart to it the form shown in Fig. 2, the sheet being fed into the corrugating rollers in such a manner that the slits 3 are disposed along the crests of the resulting corrugations. The electrode sheet is completed by bending the material adjacent to the slits 3 into the parallel relation shown at 5 in Fig. 3, the portions 5 of the sheet being flat and perpendicular to the original plane of the sheet and being connected by the corrugated end portions 6. The same result may be obtained by corrugating only the edges of the sheet, in which case the strips between the parallel slits are brought at once into their final positions.

Fig. 4 shows a modified form of construction in which a single sheet 7 of filming material is provided with two separate sets 8 and 9 of integral and parallel strips. This form of plate is produced in the same manner as that shown in Figs. 1 to 3 except that sheet material is provided with two separate slotted areas, with the result that the sets of strips 8 and 9 are connected by an integral corrugated portion 10, the outer ends of the strips being connected, as in the form of electrode first described, by means of corrugated integral end pieces 11. Both of the electrode forms which I have shown and described may be disposed either horizontally or vertically in use. If the electrodes are placed vertically, the long dimensions of the parallel strips 5 are preferably vertical, in order that convection currents set up in the electrolyte may pass freely through the electrodes.

Figs. 5 and 6 of the drawing illustrate an electrolytic cell provided with electrodes constructed in the manner described above and comprising a rectangular container 15 which is preferably provided with a lining 16 of aluminum or of such other filming material as is employed for the electrodes of the cell. The container 15 is provided with a cover 17 from which are suspended eight vertical rods 18 for supporting a series of superposed electrodes 19, each of which is composed, in the manner described above, of a considerable number of parallel strips 5 connected by means of corrugated end pieces 6. In order to increase the transverse rigidity of the electrodes, one or more stiffening rods 19 may be passed through the corrugated end pieces or through the strips 5 midway of their ends, as best shown in Fig. 1.

The electrodes may be supported within the container 15 in any suitable manner. As shown, each of the electrodes is provided with four outwardly extending lugs 20, two of which are disposed at diagonally opposite corners of the electrode, while the other two are disposed at some distance from the remaining corners of the electrode. The electrodes constructed in this manner are superposed, the alternate electrodes being turned end for end to bring the corresponding lugs 20 belonging to the plate of one polarity into vertical alinement. Each of the vertical rods 18 extends through openings in one vertically alined set of the lugs 20 and the several electrodes are vertically spaced apart the proper distances by means of spacing sleeves 21 which surround the supporting rods 18 between the lugs 20. The lower electrode of each set rests upon flanges or nuts 22 on the lower ends of the rods 18.

The upper and lower electrodes are of one-half the thickness of the intermediate electrodes, since each of the intermediate electrodes coöperates with an electrode above and below it, while the upper and lower electrodes coöperate with one adjacent electrode only. A splash-plate 23 may be supported between the cover 17 and the upper electrode, the splash-plate being suitably composed of a sheet of aluminum supported by one of the sets of rods 18 of the same polarity. Terminal devices 24 are secured to the upper ends of two of the suspension rods 18 belonging to sets of electrodes of opposite polarity.

While I have illustrated certain forms of electrode construction which are well adapted to carry my invention into practice, it is to be understood that the principles of my invention may be employed in various other constructions which may readily be devised by persons skilled in the art to which my invention relates. I therefore desire that the structural details which I have shown and described be taken as illustrative only and not as imposing limitations upon my invention, the scope of which is indicated in the appended claims.

I claim as my invention:

1. An electrode for electrolytic condensers, lightning arresters, rectifiers and the like comprising a plurality of side-by-side and parallel strips of filming material connected at their ends by means of corrugated end pieces integral with the said strips.

2. An electrode for electrolytic condensers, lightning arresters, rectifiers and the like comprising a plurality of side-by-side and parallel strips of filming material connected at their ends by means of corrugated end pieces integral with and having corrugations parallel to the said strips.

3. An electrode for electrolytic condensers, lightning arresters, rectifiers and the like comprising a plurality of side-by-side and parallel strips of aluminum connected at their ends by means of corrugated end pieces integral with the said strips.

4. An electrode for electrolytic condensers, lightning arresters, rectifiers and the like comprising a plurality of side-by-side elements of filming material connected at their ends by means of corrugated end pieces integral with the said elements and reinforcing members extending through the corrugations of the said end pieces.

5. An electrode for electrolytic condensers, lightning arresters, rectifiers and the like comprising a plurality of side-by-side and parallel strips of filming material connected at their ends by means of corrugated end pieces integral with the said strips and reinforcing rods of filming material extending through the corrugations of the said end pieces.

6. An electrode for electrolytic condensers, lightning arresters, rectifiers and the like comprising a plurality of side-by-side and parallel strips of filming material connected at their ends by means of corrugated end pieces integral with and having corrugations parallel to the said strips and reinforcing rods of filming material extending through the corrugations of the said end pieces.

7. An electrode for electrolytic condensers, lightning arresters, rectifiers and the like formed from a single sheet of filming material and comprising a plurality of portions severally composed of side-by-side strips, the said portions and the ends of the said strips being connected by means of corrugated pieces integral with the said strips.

8. An electrode for electrolytic condensers, lightning arresters, rectifiers and the like formed from a single sheet of filming material and comprising a plurality of portions severally composed of side-by-side strips, the said portions and the ends of the said strips being connected by means of corrugated pieces integral with the said strips and reinforcing rods of filming material extending through the corrugations in the said connecting pieces.

9. An electrolytic cell comprising a plurality of adjacent electrodes severally composed of a plurality of side-by-side and parallel strips of filming material connected at their ends by means of corrugated end pieces integral with the said strips.

10. The process of making an electrode for electrolytic cells that comprises forming a plurality of parallel slits in a sheet of electrode material and bending the unslitted portions of said sheet adjacent to the ends of the said slits and thereby bringing the strips of material between the said slits into parallel and side-by-side relation.

11. The process of making an electrode for electrolytic cells that comprises forming a plurality of parallel I-shaped slits in a sheet of electrode material and corrugating the said sheet adjacent to the ends of the said slits and thereby bringing the strips of material between the said slits into parallel and side-by-side relation.

12. The process of making an electrode for electrolytic cells that comprises forming a plurality of parallel I-shaped slits in a sheet of filming metal, perforating the said sheet adjacent to the ends of the said slits, corrugating the perforated portion of the said sheet and thereby bringing the said perforations and the strips of metal between the said slits into parallel and side-by-side relation and passing reinforcing rods through the sets of alined perforations.

13. An electrode for electrolytic condensers, lightning arresters, rectifiers and the like comprising a corrugated and slitted sheet of film-forming material.

14. An electrode for electrolytic condensers, lightning arresters, rectifiers and the like comprising a sheet of film-forming material longitudinally corrugated, with the bends of the corrugations longitudinally slitted and opened out throughout a portion of their length.

15. An electrode for electrolytic condensers, lightning arresters, rectifiers and the like comprising a plurality of side-by-side elements of filming material connected at their ends by means of corrugated end pieces integral with the said elements.

In testimony whereof I have hereunto subscribed my name this 4th day of April 1917.

CLARENCE J. ROTTMANN.